United States Patent
Krenzer

[11] 3,860,593
[45] Jan. 14, 1975

[54] THIADIAZOLE SUBSTITUTED TRIAZINES

[75] Inventor: John Krenzer, Oak Park, Ill.

[73] Assignee: Velsicol Chemical Corporation, Chicago, Ill.

[22] Filed: Oct. 10, 1972

[21] Appl. No.: 296,461

[52] U.S. Cl. .............................. 260/248 NS, 71/93
[51] Int. Cl. ............................................. C07d 55/12
[58] Field of Search ............................ 260/248 NS

[56] References Cited
UNITED STATES PATENTS
3,696,101  10/1972  Litt et al. ............................. 260/248
3,705,155  12/1972  Miller ................................... 260/248

*Primary Examiner*—John M. Ford
*Attorney, Agent, or Firm*—Robert J. Schwarz; Dietmar H. Olesch

[57] ABSTRACT

This invention discloses new compounds of the formula

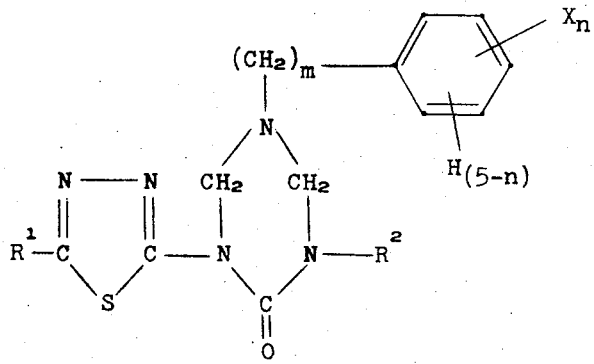

wherein $R^1$ and $R^2$ are each lower alkyl; X is selected from the group consisting of alkyl, alkenyl, halogen, haloalkyl, nitro, alkoxy, alkylthio and dialkylamino; $n$ is an integer from 0 to 3 and $m$ is an integer from 1 to 3. Further disclosed are herbicidal compositions utilizing as an essential active ingredient a compound of the above description.

6 Claims, No Drawings

THIADIAZOLE SUBSTITUTED TRIAZINES

This invention relates to new chemical compositions of matter and more specifically relates to new compounds of the formula

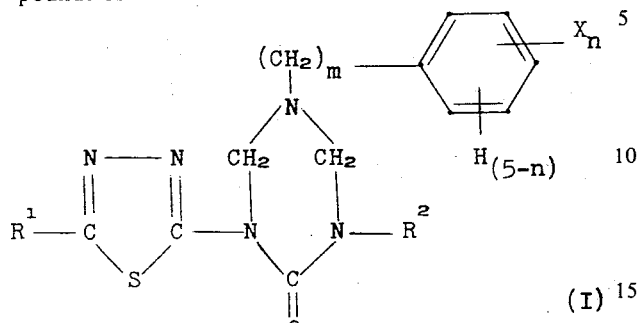

wherein $R^1$ and $R^2$ are each lower alkyl; X is selected from the group consisting of alkyl, alkenyl, halogen, haloalkyl, nitro, alkoxy, alkylthio and dialkylamino; $n$ is an integer from 0 to 3 and $m$ is an integer from 1 to 3.

The term lower as used herein designates a straight or branched carbon chain of up to 6 carbon atoms.

In a preferred embodiment of this invention X is selected from the group consisting of lower alkyl, chlorine, bromine, trifluoromethyl, nitro, lower alkoxy, lower alkylthio and di(lower alkyl)amino; and $n$ is an integer from 0 to 3.

The compounds of the present invention are unexpectedly useful as pesticides particularly as herbicides.

The compounds of the present invention can be readily prepared from a thiadiazole substituted urea of the formula

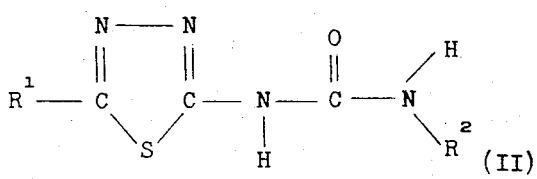

wherein $R^1$ and $R^2$ are as heretofore described, by reaction first with aqueous formaldehyde and then with an amine of the formula

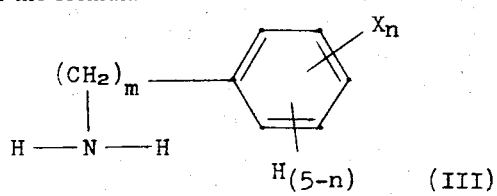

wherein X, $m$ and $n$ are as heretofore described. The reaction of the urea of Formula II with the aqueous formaldehyde can be effected by preparing a solution or slurry of the urea in an organic liquid such as dimethylformamide, cooling the solution or slurry to a temperature below about 35°C and thereafter adding the aqueous formaldehyde at a concentration of from about 10 to about 40 percent by weight thereto. After the addition of the formaldehyde the reaction mixture can be stirred for a period of about ½ hour if desired. After this time the amine of Formula III can be added to the reaction mixture. The amine can be added as such or in the form of a solution in a suitable solvent. Upon addition of the amine the reaction mixture can be heated at a temperature of from about 40° to about 100°C for a period of from ½ to about 8 hours to ensure completion of the reaction. After this time the reaction mixture can be stripped of solvents under reduced pressure to yield the desired product as a residue. This residue can be used as such or can be further purified by standard techniques.

The thiadiazole substituted ureas of Formula II when not available can be prepared from an appropriately substituted thiadiazole having the formula

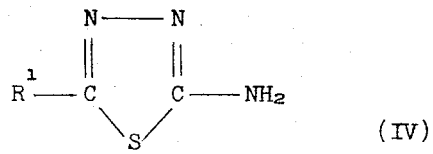

wherein $R^1$ is as heretofore described, by reaction with an isocyanate of the formula

wherein $R^2$ is as heretofore described. This reaction can be readily effected by incrementally adding the isocyanate to a solution of the thiadiazole. After the addition is completed the reaction mixture can be heated with stirring to ensure completion of the reaction. After this time the reaction mixture can be stripped of solvent to yield the desired thiadiazole substituted urea.

Exemplary thiadiazole compounds of Formula IV useful for preparing the compounds of the present invention are 2-amino-5-methyl-1,3,4-thiadiazole, 2-amino-5-ethyl-1,3,4-thiadiazole, 2-amino-5-isopropyl-1,3,4-thiadiazole, 2-amino-5-t-butyl-1,3,4-thiadiazole, 2-amino-5-hexyl-1,3,4-thiadiazole and the like.

Exemplary isocyanates of Formula V are methyl isocyanate, ethyl isocyanate, propyl isocyanate, butyl isocyanate, pentyl isocyanate, hexyl isocyanate and the like.

Exemplary amines of Formula III useful for preparing the compounds of this invention are benzylamine, β-phenylethylamine, γ-phenylpropylamine, 4-chlorobenzylamine, 3,4-dibromobenzylamine, 2-methyl-4-chlorobenzylamine, 4-nitrobenzylamine, 3-methylthiobenzylamine, 4-fluorobenzylamine, 3-propyl-5-ethoxybenzylamine, 3-allylbenzylamine, 2-dimethylaminobenzylamine and the like.

The manner in which the compounds of the present invention can be prepared readily is more specifically illustrated in the following examples.

EXAMPLE 1

Preparation of
N-(5-Isopropyl-1,3,4-thiadiazol-2-yl)-N'-Methylurea

A solution of 2-amino-5-isopropyl-1,3,4-thiadiazole (50 grams) in acetone (200 ml) was charged into a glass reaction flask equipped with a mechanical stirrer and reflux condenser. Methyl isocyanate (21 grams) was incrementally added to the reaction mixture with stirring. After the addition was completed, stirring was continued for an additional period of about ½ hour to ensure completion of the reaction. After this time the reaction mixture was stripped of solvent to yield a solid residue. The residue was washed with hexane to yield the desired product N-(5-isopropyl-1,3,4-thiadiazol-2-yl)-N'-methylurea.

EXAMPLE 2

Preparation of
1-(5-Isopropyl-1,3,4-thiadiazol-2-yl)-3-methyl-5-benzylhexahydro-s-triazine-2-one N-(5-Isopropyl-1,3,4-thiadiazol-2-yl)-N'-methylurea (10.6 grams) was dissolved in dimethylformamide (50 ml) and charged into a glass reaction vessel equipped with a mechanical stirrer and cooling means. The solution is cooled to a temperature below about 35°C and aqueous formaldehyde (16 ml; 36 percent concentration) was incrementally added thereto. The temperature of the reaction mixture was maintained below about 35°C during the addition of the formaldehyde. After the addition was completed stirring was continued for a period of about ½ hour. After this time benzylamine (6 grams) was added to the reaction mixture with continued cooling. After the addition was completed the mixture was stirred overnight at room temperature. The reaction mixture was then warmed on a steam bath for a period of about 1 hour and thereafter stripped of solvent under reduced pressure to yield a solid product. This solid product was recrystallized from heptane to yield the desired product 1-(5-isopropyl-1,3,4-thiadiazol-2-yl)-3-methyl-5-benzylhexahydro-s-triazine-2-one having a melting point of 107° to 109°C.

EXAMPLE 3

Preparation of
N-(5-t-Butyl-1,3,4-thiadiazol-2-yl)-N'-Methylurea

A solution of 2-amino-5-t-butyl-1,3,4-thiadiazole (21 grams) in ethyl acetate (120 ml) was charged into a glass reaction vessel equipped with a mechanical stirrer and reflux condenser. Methyl isocyanate (9 grams) was incrementally added to the reaction mixture with stirring. After the addition was completed stirring was continued for an additional period of about ½ hour to ensure completion of the reaction. After this time the reaction mixture was stripped of solvent to yield a solid residue. The residue was washed with hexane to yield the desired product N-(5-t-butyl-1,3,4-thiadiazol-2-yl)-N'-methylurea.

EXAMPLE 4

Preparation of
1-(5-t-Butyl-1,3,4-thiadiazol-2-yl)-3-methyl-5-Benzylhexahydro-s-Triazine-2-one N-(5-t-Butyl-1,3,4-thiadiazol-2-yl)-N'-methylurea (11.3 grams), dimethylformamide (50 ml) and a solution of formaldehyde (16 ml; 36 percent concentration) were charged into a glass reaction flask equipped with a mechanical stirrer and reflux condenser. The mixture was cooled to a temperature below about 35°C and was stirred for a period of about ½ hour. After this time benzylamine (6 grams) was incrementally added to the reaction mixture over a period of about 30 minutes. The reaction mixture was then stirred at room temperature for a period of about 16 hours. The mixture was thereafter heated on a steam bath for about two hours and was then stripped of solvent under reduced pressure to yield a solid residue. This residue was recrystallized from heptane to yield the desired product 1-(5-t-butyl-1,3,4-thiadiazol-2-yl)-3-methyl-5-benzylhexahydro-s-triazine-2-one having a melting point of 127° to 128°C.

Additional compounds within the scope of the present invention can be prepared by the procedures detailed in the foregoing examples. In the following examples are given the essential starting materials required for preparing the indicated named compounds.

EXAMPLE 5

2-Amino-5-t-butyl-1,3,4-thiadiazole + ethyl isocyanate + formaldehyde + benzylamine = 1-(5-t-butyl-1,3,4-thiadiazol-2-yl)-3-ethyl-5-benzylhexahydro-s-triazine-2-one.

EXAMPLE 6

2-Amino-5-t-butyl-1,3,4-thiadiazole + methyl isocyanate + formaldehyde + β-phenylethylamine = 1-(5-t-butyl-1,3,4-thiadiazol-2-yl)-3-methyl-5-(β-phenylethyl)hexahydro-s-triazine-2-one.

EXAMPLE 7

2-Amino-5-t-butyl-1,3,4-thiadiazole + ethyl isocyanate + formaldehyde + γ-phenylpropylamine = 1-(5-t-butyl-1,3,4-thiadiazol-2-yl)-3-ethyl-5-(γ-phenylpropyl)hexahydro-s-triazine-2-one.

EXAMPLE 8

2-Amino-5-isopropyl-1,3,4-thiadiazole + ethyl isocyanate + formaldehyde + 2-methylbenzylamine = 1-(5-isopropyl-1,3,4-thiadiazol-2-yl)-3-ethyl-5-(2-methylbenzyl)hexahydro-s-triazine-2-one.

EXAMPLE 9

2-Amino-5-pentyl-1,3,4-thiadiazole + methyl isocyanate + formaldehyde + 3,4-dichlorobenzylamine = 1-(5-pentyl-1,3,4-thiadiazol-2-yl)-3-methyl-5-(3,4-dichlorobenzyl)hexahydro-s-triazine-2-one.

EXAMPLE 10

2-Amino-5-methyl-1,3,4-thiadiazole + n-butyl isocyanate + 2-methoxybenzylamine = 1-(5-methyl-1,3,4-thiadiazol-2-yl)-3-n-butyl-5-(2-methoxybenzyl)hexahydro-s-triazine-2-one.

EXAMPLE 11

2-Amino-5-t-butyl-1,3,4-thiadiazole + methyl isocyanate + 2-methyl-4-chlorobenzylamine = 1-(5-t-butyl-1,3,4-thiadiazol-2-yl)-3-methyl-5-(2-methyl-4-chlorobenzyl)hexahydro-s-triazine-2-one.

EXAMPLE 12

2-Amino-5-n-hexyl-1,3,4-thiadiazole + methyl isocyanate + 4-methylthiobenzylamine = 1-(5-n-hexyl-1,3,4-thiadiazol-2-yl)-3-methyl-5-(4-methylthiobenzyl)hexahydro-s-triazine-2-one.

Additional compounds within the scope of the present invention which can be prepared by the procedures of the foregoing examples are 1-(5-ethyl-1,3,4-thiadiazol-2-yl)-3-n-propyl-5-(3-allyl-5-chloromethylbenzyl)hexahydro-s-triazine-2-one, 1-(5-methyl-1,3,4-thiadiazol-2-yl)-3-methyl-5-[β-(3,4-dibromophenyl)ethyl]hexahydro-s-triazine-2-one, 1-(5-t-butyl-1,3,4-thiadiazol-2-yl)-3-methyl-5-[γ-(3-chlorophenyl)propyl]-hexahydro-s-triazine-2-one, 1-(5-t-butyl-1,3,4-thiadiazol-2-yl)-3-methyl-5-(3-n-pentyl-5-nitrobenzyl)hexahydro-s-triazine-2-one, 1-(5-t-butyl-1,3,4-thiadiazol-2-yl)-3-methyl-5-(2-n-hexyl-4,5-dibromobenzyl)hexahydro-s-triazine-2-one, 1-(5-isopropyl-1,3,4-thiadiazol-2-yl)-3-methyl-5-(2-methylthiobenzyl)hexahydro-s-triazine-2-one, 1-(5-methyl-1,3,4-thiadiazol-2-yl)-3-methyl-5-(2-n-propoxybenzyl)hexahydro-s-triazine-2-one, 1-(5-n-pentyl-1,3,4-thiadiazol-2-yl)-3-methyl-5-(2-hexyloxybenzyl)-hexahydro-s-triazine-2-one, 1-(5- methyl-1,3,4-thiadiazol-2-yl)-3-methyl-5-(2-n-propylthiobenzyl)hexahydro-s-triazine-2-one, 1-(5-methyl-1,3,4-thiadiazol-2-yl)-3-methyl-5-(2-n-hexylthiobenzyl)hexahydro-s-triazine-2-one, 1-(5-methyl-1,3,4-thiadiazol-2-yl)-3-methyl-5-(3-di-n-hexylaminobenzyl)hexahydro-s-triazine-2-one, 1-(5-t-butyl-1,3,4-thiadiazol-2-yl)-3-methyl-5-(4-dimethylaminobenzyl)hexahydro-s-triazine-2-one, 1-(5-t-butyl-1,3,4-thiadiazol-2-yl)-3-methyl-5-(4-di-n-butylaminobenzyl)hexahydro-s-triazine-2-one, 1-(5-t-butyl-1,3,4-thiadiazol-2-yl)-3-methyl-5-(4-trifluoromethylbenzyl)hexahydro-s-triazine-2-one, 1-(5-t-butyl-1,3,4-thiadiazol-2-yl)-3-methyl-5-(4-iodobenzyl)hexahydro-s-triazine-2-one, 1-(5-t-butyl-1,3,4-thiadiazol-2-yl)-3-methyl-5-(4-fluorobenzyl)hexahydro-s-triazine-2-one, and the like.

For practical use as herbicides the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite and the like. Granular formulations can be prepared by impregnating the compound, usually dissolved in a suitable solvent, onto and into granulated carriers such as the attapulgites or the vermiculites, usually of a particle size range from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water in oil) can be prepared for direct application to weed infestations.

A typical herbicidal composition according to this invention is illustrated by the following example, in which the quantities are in parts by weight.

Example 13

Preparation of a Dust

| | |
|---|---|
| Product of Example 2 | 10 |
| Powdered Talc | 90 |

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a compound of this invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides and the like; stabilizers, spreaders, deactivators, adhesives, stickers, fertilizers, activators, synergists and the like.

The compounds of the present invention are also useful when combined with other herbicides and/or defoliants, dessicants, growth inhibitors and the like in the herbicidal compositions heretofore described. These other materials can comprise from about 5 percent to about 95 percent of the active ingredients in the herbicidal compositions. Use of combinations of these other herbicides and/or defoliants, dessicants, etc. with the compounds of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), 2,4-DEB, 4-CPB, 4-CPA, 4-CPP, 2,4,5-TB, 2,4,5-TES, 3,4-DA, silvex and the like; carbamate herbicides such as IPC, CIPC, swep, barban, BCPC, CEPC, CPPC and the like; thiocarbamate and dithiocarbamate herbicides such as CDEC, metham sodium, EPTC, diallate, PEBC, perbulate, vernolate and the like; substituted urea herbicides such as norea, siduron, dichloral urea, chloroxuron, cycluron, fenuron, monuron, monuron TCA, diuron, linuron, monolinuron, neburon, buturon, trimeturon and the like; symmetrical triazine herbicides such as simazine, chlorazine, atratone, desmetryne, norazine, ipazine, prometryn, atrazine, trietazine, simetone, prometone, propazine, ametryne and the like; chloroacetamide herbicides such as alpha-chloro-N,N-dimethylacetamide, CDEA, CDAA, alpha-chloro-N-isopropylacetamide, 2-chloro-N-isopropylacetanilide, 4-(chloroacetyl)morpholine, 1-(chloroacetyl)piperidine and the like; chlorinated aliphatic acid herbicides such as TCA, dalapon, 2,3-dichloropropionic acid, 2,2,3-TPA and the like; chlorinated benzoic acid and phenylacetic acid herbicides such as 2,3,6-TBA, 2,3,5,6-TBA, dicamba, tricamba, amiben, fenac, PBA, 2-methoxy-3,6-dichlorophenylacetic acid, 3-methoxy-2,6-dichlorophenylacetic acid, 2-methoxy-3,5,6-trichlorophenylacetic acid, 2,4-dichloro-3-nitrobenzoic acid and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil, DPA, diphenamid, dipropalin, trifluralin, solan, dicryl, merphos, DMPA, DSMA, MSMA, potassium azide, acrolein, benefin, bensulide, AMS, bromacil, 2-(3,4-dichlorophenyl)-4-methyl-1,2,4-oxadiazolidine-3,5-dione, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP-50144, H-176-1, H-732, M-2901, planavin, sodium tetraborate, calcium cyanamid, DEF, ethyl xanthogen disulfide, sindone, sindone B, propanil and the like.

Such herbicides can also be used in the methods and compositions of this invention in the form of their salts, esters, amides, and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goosegrass, chickweed, wild oats, velvetleaf, purslane, barnyardgrass, smartweed, knotweed, cocklebur, wild buckwheat, kochia, medic, corn cockle, ragweed, sowthistle, coffeeweed, croton, cuphea, dodder, fumitory, groundsel, hempnettle, knowel, spurge, spurry, emex, jungle rice, pondweed, dog fennel, carpetweed, morningglory, bedstraw, ducksalad and naiad; biennials such as wild carrot, matricaria, wild barley, campion, chamomile, burdock, mullein, round-leaved mallow, bullthistle, houndstongue, moth mullein and purple star thistle; or perennials such as white cockle, perennial ryegrass, quackgrass, Johnsongrass, Canada thistle, hedge bindweed, Russian knapweed, mesquite, toadflax, yarrow, aster, gromwell, horsetail, ironweed, sesbania, bulrush, cattail and wintercress.

Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The exact amount of compound required will depend on a variety of factors, including the hardiness of the particular weed species, weather, type of soil, method of application, the kind of beneficial plants in the same area and the like. Thus, while the application of up to only about one to two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compounds of this invention can be illustrated by many of the established testing techniques known to the art, such as pre- and post- emergence testing.

The herbicidal activity of the compounds of this invention was demonstrated by experiments carried out for the pre-emergence control of a variety of weeds. In these experiments small plastic greenhouse pots filled with dry soil were seeded with the weed seeds. Twenty-four hours or less after seeding the pots were sprayed with water until the soil was wet and the test compounds formulated as aqueous emulsions of acetone solutions containing emulsifiers were sprayed at the indicated concentrations on the surface of the soil.

After spraying, the soil containers were placed in the greenhouse and provided with supplementary heat as required and daily or more frequent watering. The plants were maintained under these conditions for a period of 22 days, at which time the condition of the plants and the degree of injury to the plants was rated on a scale of from 0 to 10, as follows: 0 = no injury, 1,2 = slight injury, 3,4 = moderate injury, 5,6 = moderately severe injury, 7,8,9 = severe injury and 10 = death. The effectiveness of these compounds is demonstrated by the following data:

TABLE I

| Weed Species | Injury Rating Prod. of Ex.4 Rate lbs/acre | | |
|---|---|---|---|
| | 5 | 2 | 1 |
| Yellow Nut Sedge | 9 | 8 | 5 |
| Wild Oats | 10 | 9 | 9 |
| Jimsonweed | 10 | 10 | 10 |
| Velvetleaf | 10 | 10 | 10 |
| Johnsongrass | 9 | 10 | 4 |
| Pigweed | 10 | 10 | 10 |
| Mustard | 10 | 10 | 10 |
| Yellow Foxtail | 10 | 10 | 10 |
| Barnyardgrass | 10 | 10 | 8 |
| Crabgrass | 10 | 10 | 10 |
| Downy Brome | 9 | 9 | 9 |
| Wild Morningglory | 10 | 8 | 9 |

The herbicidal activity of the compounds of this invention was also demonstrated by experiments carried out for the post-emergence control of a variety of weeds. In these experiments the compounds to be tested were formulated as aqueous emulsions and sprayed at the indicated dosage on the foliage of the weeds that had attained a prescribed size. After spraying, the plants were placed in a greenhouse and watered daily or more frequently. Water was not applied to the foilage of the treated plants. The severity of the injury was determined 17 days after treatment and was rated on the scale from 0 to 10 as heretofore described. The effectiveness of these compounds is demonstrated by the following data:

TABLE II

| Weed Species | Injury Rating Prod. of Ex.4 Rate lbs/acre | | |
|---|---|---|---|
| | 5 | 2 | 1 |
| Yellow Nut Sedge | 10 | 9 | 3 |
| Wild Oats | 10 | 10 | 10 |
| Jimsonweed | 10 | 10 | 10 |
| Pigweed | 10 | 10 | 10 |
| Johnsongrass | 10 | 10 | 8 |
| Velvetleaf | 10 | 10 | 10 |
| Mustard | 10 | 10 | 10 |

TABLE II-Continued

| Weed Species | Injury Rating Prod. of Ex.4 Rate lbs/acre | | |
|---|---|---|---|
| | 5 | 2 | 1 |
| Yellow Foxtail | 10 | 10 | 10 |
| Barnyardgrass | 10 | 10 | 9 |
| Crabgrass | 10 | 8 | 5 |
| Wild Morningglory | 10 | 10 | 5 |
| Downy Brome | 10 | 10 | 10 |

I claim:
1. A compound of the formula

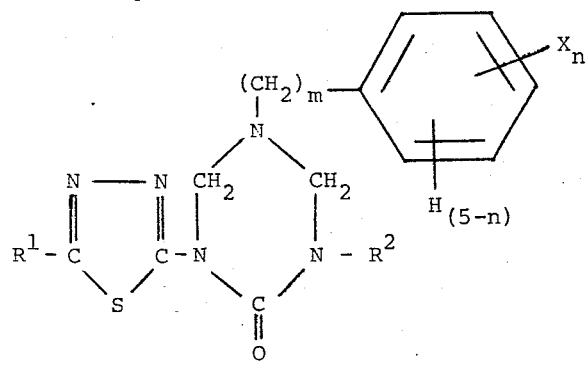

wherein $R^1$ and $R^2$ are each lower alkyl; X is selected from the group consisting of lower alkyl, halogen, trifluoromethyl, nitro, lower alkoxy, lower alkylthio and di(lower alkyl)amino; n is an integer from 0 to 3 and m is an integer from 1 to 3.

2. The compound of claim 1, 1-(5-isopropyl-1,3,4-thiadiazol-2-yl)-3-methyl-5-benzylhexahydro-s-triazine-2-one.

3. The compound of claim 1, 1-(5-t-butyl-1,3,4-thiadiazol-2-yl)-3-methyl-5-benzylhexahydro-s-triazine-2-one.

4. The compound of claim 1, 1-(5-t-butyl-1,3,4-thiadiazol-2-yl)-3-ethyl-5-benzylhexahydro-s-triazine-2-one.

5. The compound of claim 1, 1-(5-t-butyl-1,3,4-thiadiazol-2-yl)-3-methyl-5-($\beta$-phenylethyl)hexahydro-s-triazine-2-one.

6. The compound of claim 1, 1-(5-t-butyl-1,3,4-thiadiazol-2-yl)-3-ethyl-5-($\gamma$-phenylpropyl)hexahydro-s-triazine-2-one.

* * * * *